United States Patent
Bodin et al.

(10) Patent No.: US 7,206,682 B2
(45) Date of Patent: Apr. 17, 2007

(54) UPHILL START-UP ASSISTANCE DEVICE FOR MOTOR VEHICLE

(75) Inventors: Pascal Bodin, Guyancourt (FR); Emmanuel Devaud, Clamart (FR); Joel Szymanski, Les Clayes sous Bois (FR)

(73) Assignee: Renault s.a.s., Boulogne Billancourt (FR)

( * ) Notice: Subject to any disclaimer, the term of this patent is extended or adjusted under 35 U.S.C. 154(b) by 308 days.

(21) Appl. No.: 10/485,118

(22) PCT Filed: Jul. 30, 2002

(86) PCT No.: PCT/FR02/02744

§ 371 (c)(1),
(2), (4) Date: Jan. 7, 2005

(87) PCT Pub. No.: WO03/013897

PCT Pub. Date: Feb. 20, 2003

(65) Prior Publication Data

US 2006/0106520 A1      May 18, 2006

(30) Foreign Application Priority Data

Aug. 7, 2001   (FR) .................................. 01 10558

(51) Int. Cl.
*G06F 7/70* (2006.01)

(52) U.S. Cl. ............................ 701/67; 701/70; 701/78; 701/87

(58) Field of Classification Search .................. 701/36, 701/51, 53, 67, 70, 78, 87, 77, 71; 192/85 R, 192/3.51, 3.63; 477/107
See application file for complete search history.

(56) References Cited

U.S. PATENT DOCUMENTS

| | | | | |
|---|---|---|---|---|
| 6,540,035 | B2 * | 4/2003 | Nagano et al. | 180/65.2 |
| 6,679,807 | B2 * | 1/2004 | Kato et al. | 477/107 |
| 6,843,754 | B2 * | 1/2005 | Mori et al. | 477/92 |
| 7,032,697 | B2 * | 4/2006 | Lee | 180/65.2 |

FOREIGN PATENT DOCUMENTS

| | | |
|---|---|---|
| DE | 19733465 | 2/1998 |
| DE | 19751659 | 6/1999 |
| DE | 10025731 | 12/2000 |
| EP | 0786368 | 7/1997 |
| EP | 1035344 | 9/2000 |
| EP | 1040957 | 10/2000 |
| FR | 2798174 | 3/2001 |
| JP | 03121959 | 5/1991 |
| WO | 076818 | 12/2000 |

* cited by examiner

*Primary Examiner*—Richard M. Camby
(74) *Attorney, Agent, or Firm*—Oblon, Spivak, McClelland, Maier & Neustadt, P.C.

(57) ABSTRACT

A device for uphill start-up assistance for a motor vehicle including a control for controlling release of the vehicle mechanical brakes that act on the vehicle wheels, so that the vehicle is maintained on the slope when maneuvering uphill without any intervention from the driver on this maintaining condition. The control uses mainly the state of the slope, the interpretation and anticipation of the commands of driver and/or of a central driving member, and the determined instantaneous clutching characteristics. In a preferred embodiment, the assistance device co-operates with an electrical device of the parking brake.

33 Claims, 4 Drawing Sheets

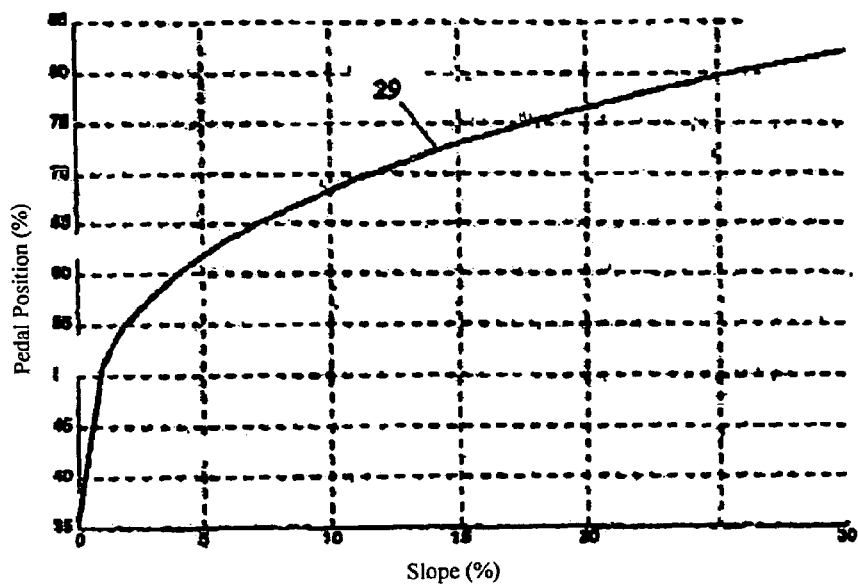
Figure 4
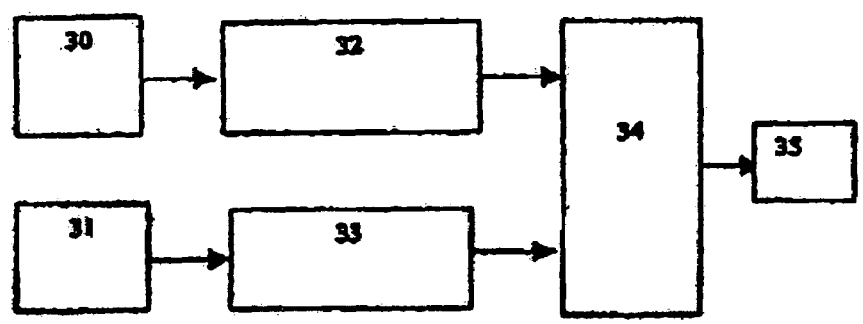

UPHILL START-UP ASSISTANCE DEVICE FOR MOTOR VEHICLE

The present invention relates to a device for assisting uphill start of a motor vehicle.

In the prior art there is known a manual brake device, designated "handbrake", which permits essentially two functions. Firstly, such a device is capable of mechanically ensuring, without input of external energy, that the vehicle will be maintained immobile even if subjected to moderate actions intended to make it move. This function is not a direct concern of the present invention. Secondly, because of the features of the clutch device and of the ergonomics of the driving controls, the manual brake device makes it possible to hold a vehicle on a slope without rolling back during a gearbox-ratio change, since in most cases a change of gearbox ratio is preceded by clutch disengagement, disconnecting the motive power from the wheels and leaving the vehicle exposed to the action of gravity and inertia on the slope.

In such a maneuver, known as "uphill start", or in similar driving situations, the driver, who is using both feet to operate the clutch pedal and the accelerator pedal simultaneously, must at the same time hold the vehicle at least stationary on a hill for the time during which he changes the ratio in the gearbox and balances the forward drive of the vehicle against the effect of gravity on the slope.

The use of an electric parking-brake device makes it possible to automate this task, which then falls under the control of an automatic system. However, the application of an automatic system with this uphill maneuvering function is not as straightforward as it seems, because the wear condition of the rear brakes of the vehicle makes it impossible for the electric brake device to exert an identical action during each operation in response to a given command.

In the prior art, there is described an electric parking-brake device whose clamping force and therefore brake-release force can be applied under the control of a central unit via a signaling bus such as a CAN bus. Such a device is perfectly adapted to the present invention in the device for assisting uphill maneuvers. A definition of this prior art is illustrated in FIG. 2 of the present Application.

Aside from problems associated with the brake system, a device for assisting uphill maneuvers would have to solve problems associated with the clutch-engagement situation. In fact, the clutch-engagement point, an essential parameter in achieving an uphill maneuver, changes continuously throughout the life of the vehicle.

Furthermore, it must be noted that the brake systems of numerous vehicles are provided with actuators that can be controlled from a central brake unit, in which case it is not necessary to provide an electric parking-brake device in order to use the device of the present invention for assisting uphill maneuvers. It is sufficient to equip the vehicle with a means for controlling brake release during execution of the uphill maneuver.

The invention offers a novel and advantageous solution for assisting the driver during an uphill maneuver.

In the patent application entitled "CLUTCH CONTROL SYSTEM", WO 98/28162, published 2 Jul. 1998, and in the patent application entitled "METHOD AND APPARATUS FOR OPERATING A CLUTCH IN AN AUTOMATED MECHANICAL TRANSMISSION", WO 98/46908, published 22 Oct. 1998, there was described a method for identifying the "kiss point" of a vehicle clutch for applications to robotized transmissions. Such a method for identifying the "kiss point" makes it necessary to resort to a pilot system for clutch engagement, which is not a simple and reliable technique in the case of an application to parking. Moreover, only the kiss point of the clutch-engagement curve is learned in these two documents, whereas the problem addressed by the invention is that of learning almost the entire clutch-engagement curve. Thus the prior art is not capable of solving this problem which, incidentally, is not the only basis of the invention.

Finally, during the search for solutions to the different problems mentioned in the foregoing, the inventor realized that it was impossible to produce a device for assisting uphill maneuvers if such a device did not incorporate a means for predicting the driver's behavior and for interpreting and anticipating certain of his commands, especially via the accelerator pedal or any equivalent element. In particular, such a means must take into account the gradient to be negotiated by the vehicle.

The invention offers a novel and advantageous solution for solving these various problems.

In fact, the invention relates to a device for assisting uphill maneuvers in such a way that the task of holding the vehicle on the slope by using the brake system is no longer accomplished solely by the driver. The vehicle is provided with a motive power unit connected to the driving wheels via a clutch and a gearbox, whose ratios can be selected during decoupling of the motive power by clutch disengagement, and finally, a brake system in which at least brake release can be controlled. For this purpose, the inventive device comprises:

a means for estimating the slope to be negotiated by the vehicle;

a means for interpreting the commands of the driver and/or of a central driving unit;

a means for determining the instantaneous clutch-engagement characteristics;

a means connected to the foregoing three means for effecting a brake-system release command, in such a way that the vehicle is held on the slope during the maneuver.

According to another aspect of the invention, the means for effecting a brake-release command generates an active output signal when the torque transmitted to the wheel is greater than a predetermined value of the torque for holding on the slope.

According to another aspect of the invention, the means is provided with a means for generating a predetermined value of the torque for holding on the slope.

According to another aspect of the invention, the means for generating a predetermined value of holding torque is provided with a memory of characteristics of transmitted torques capable of holding the vehicle on the slope, wherein the signal being read is addressed by a detection signal generated by a slope sensor.

According to another aspect of the invention, addressing of the memory also depends on a signal, generated by a vehicle-mass estimator, of a measurement of the mass of the vehicle.

According to another aspect of the invention, the memory of characteristics of transmitted torques capable of holding the vehicle on the slope is provided with a means for updating the characteristics as a function of the wear and aging of the clutch.

According to another aspect of the invention, the updating means is provided with a transmitted-torque estimator.

According to another aspect of the invention, the transmitted-torque estimator is provided with a means for detecting a gearbox-ratio change.

According to another aspect of the invention, the means for detecting a gearbox-ratio change is provided with a means for detecting a high clutch position and a means for detecting a low clutch position, which means are connected to a sensor for measuring the degree of depression of the clutch pedal, and with a means for detecting a predetermined sequence of clutch-engagement actions.

According to another aspect of the invention, the transmitted torque estimator is provided with a means for estimating a point on the transmitted-torque characteristic on the basis of estimation of the mean torque at the wheel.

According to another aspect of the invention, the means for estimating a point on the transmitted-torque characteristic is provided with a computing means for executing the operation $\hat{C}_T = C_{m_{EST}} - J_m \dot{\omega}_m$ that returns the estimated value of the transmitted engine torque.

According to another aspect of the invention, the means for estimating a point on the transmitted-torque characteristic is also provided with:

a first test means, which generates an active test signal when there are no loads on line and which indicates that the estimate of the engine torque is valid:

a second test means, which generates an active test signal during the clutch-reengagement phase;

a means for estimating the transmission ratio r(b) during the clutch-engagement phase;

a means for computing the slipping rate $$\Delta \omega = \omega_m - \frac{\omega_R}{r(b)}$$

of the clutch.

According to another aspect of the invention, the means for estimating a point on the transmitted-torque characteristic is also provided with two test means, which are internal to the validation means and which respectively execute the following tests:

$C_{TMIN_i} \leq \hat{C}_T \leq C_{TMAX_i}$ $\Delta \omega \leq \Delta \omega_{SEUIL} < 0$ in such a way that, when the two test means have verified that the conditions are satisfied, an appropriate output terminal of the validation means delivers a sensed point defined by $P_i = (C_{T_i}, \theta_{emb_i})$ in the course of clutch reengagement, the three threshold values $C_{TMIN_i}$, $C_{TMAX_i}$, and $\Delta \omega_{SEUIL}$ being saved in permanent memories of the validation means.

According to another aspect of the invention, the transmitted-torque estimator is also provided with a means for performing a specified plurality of operating cycles of the means for estimating a point on the transmitted-torque characteristic, in such a way that a memory receives a plurality of sensed points representing an update of the clutch-engagement characteristic.

According to another aspect of the invention, the transmitted-torque estimator is also provided with a means for initiating a new estimate of the transmitted-torque characteristic during the life of the vehicle, the said means being active in particular during a holding operation on the vehicle, at the time of a specific command by the driver, and when a means for detecting that the identified transmitted-torque curve is no longer suitable is undergoing a transition to the active state.

According to another aspect of the invention, the transmitted-torque estimator is also provided with a means for filtering the modeling and measurement errors, the said means being provided with a tool for generating an average of the positions of the sensed points.

According to another aspect of the invention, the assistance device is provided with a means for managing the wish of the driver, in order to anticipate the brake-release command, in such a way that brake release takes place at the theoretical brake-release position.

According to another aspect of the invention, the assistance device is provided with a means for anticipation by taking into account the activity of the driver on the accelerator pedal.

According to another aspect of the invention, the assistance device is provided with a first means for generating a threshold value for the depressed position of the accelerator as a function of engine speed.

According to another aspect of the invention, the means executes a function defined analytically by $\theta_{acc_{SEUIL}} = f(\theta_V, N_m)$, in which the two arguments are the slope on which the vehicle is located and the engine speed.

According to another aspect of the invention, the generator is provided with a memory containing a table of pairs of entries comprising the value of the slope and the engine speed, generating a threshold signal to be delivered to a first input of a comparator, which receives the degree of depression of the accelerator pedal at a second input and generates an active output signal if the condition $\theta_{acc} \geq \theta_{acc_{SEUIL}}$ is satisfied.

According to another aspect of the invention, the assistance device is provided with a second means for generating an anticipated braking signal having a predetermined duration, saved in a memory of the assistance device, wherein the said generating means executes a function $\theta_{emb_{anticipé}} = \theta_{emb} + \Delta T \times \theta'_{emb}$, in which the function $\theta'_{emb}$ is the instantaneous derivative of the depressed position of the clutch pedal.

According to another aspect of the invention, the parameter ($\Delta T$) is estimated as a function of the slope on which the vehicle is being held.

According to another aspect of the invention, the signal representative of the anticipated degree of depression of the clutch pedal is transmitted to the address input of a generator that generates at its output a value, in the form of a function $C_T(\theta_{emb_{anticipé}})$, representative of the torque transmitted to the wheel, the said value being transmitted to an input of a comparator, another input of which is connected to the output of the transmitted-torque estimator, in such a way that the comparator sets its output to the active state if the condition $C_{T_D} > C_T(\theta_{emb_{anticipé}})$ is satisfied.

According to another aspect of the invention, the outputs of the two comparators are connected to the input terminals of a logical AND gate, whose output is transmitted as a release instruction for the brakes when the output is in the active state.

According to another aspect of the invention, the transmitted-torque estimator is provided with a transmitted-torque generator, whose output signal is defined by the following parametric relation:

$$C_{T_{MAX}} = \begin{vmatrix} 0 & \text{if } \theta_{emb} \leq \theta_{kp} \\ c_0 (\theta_{emb} - \theta_{kp})^{d_0} & \text{if } \theta_{emb} > \theta_{kp} \end{vmatrix}$$

where $c_0$ and $d_0$ are form factors obtained from a clutch-engagement curve identifier that works in the vicinity of a predetermined kiss point (kp) of the clutch.

According to another aspect of the invention, the clutch-engagement curve identifier is provided with a previously saved memory of tables of predetermined clutch-engagement points for a set of values of form factors, the address of a predetermined table corresponding to a pair of form factors of predetermined values;

a means for estimating the clutch torque at least for two clutch-engagement states close to the kiss point;

a sensor for measuring the degree of depression of the clutch pedal, to indicate at least one first and one second clutch-engagement state after the kiss point; and an electronic controller, which is provided with:

a means for searching, during the first clutch-engagement state following the kiss point, for a subset of tables of clutch-engagement points whose first point corresponds to the said first clutch-engagement state, and a means for obtaining an estimate generated by the clutch-torque estimator in the said first clutch-engagement state, a means for searching, during the second clutch-engagement state following the first clutch-engagement state, for the table of clutch-engagement points belonging to the said subset whose second point is closest, and a means for obtaining an estimate generated by the clutch-torque estimator in the said second clutch-engagement state, and means for delivering to the output thereof a pair $(c_0, d_0)$ of form factors associated with the table found as identification of the clutch-engagement curve.

According to another aspect of the invention, the means for detecting a gearbox-ratio change is provided with a means for estimating the transmission ratio $r(b)$, the estimating means being provided with a means for executing a test beginning with values larger than b, which is being decremented, until the following condition is true: $\omega_r > [r(b)-0.5*(r(b)-r(b-1))]\omega_m$.

According to another aspect of the invention, the transmission-ratio estimator is also provided with a test means, a first input of which receives the signal, generated by an appropriate sensor or estimator and made available on the vehicle bus, of the speed of rotation of the vehicle wheels, and a second input receives the signal, generated by an appropriate sensor or estimator and made available on the vehicle bus, of the speed of rotation of the engine; in that the estimator is provided for this purpose with a memory of gearbox ratios $\{r(b); b=6 \ldots 1\}$ characteristic of the vehicle when the gearbox ratios are being downshifted and the reading output of the memory is read by a computing element that executes the operation $r(b)-0.5*(r(b)-r(b-1))$; in that the output signal of the computing element is connected to an appropriate input of the test means, which also receives the aforesaid two speeds of rotation and sets its output to active state when the test is satisfied, in such a way that, in this case, the transmission-ratio estimator transmits the value b and/or $r(b)$ at the output over the vehicle bus, and in such a way that, in the opposite case, a decrementer reduces the value of b by one unit and applies this value as the address of the previously saved memory of gearbox ratios in the transmission-ratio estimator, the next value of the memory then being addressed by the test means.

According to another aspect of the invention, the brakes cooperate with an electric parking-brake device.

According to another aspect of the invention, the electric brake device is provided with a box and a controller connected to the signaling bus, the device for assisting the uphill maneuvers being a control element working according to the bus protocol and the electric parking-brake device being a controlled element working according to the bus protocol.

According to another aspect of the invention, the controller is connected to the bus by an input/output port B and to means for receiving data representative of the clamping force applied to the mechanical brakes of the brake system, measured by a load sensor interposed between an electric motor mounted in the box and a mechanical converter, an articulated output lever of which makes it possible to urge two brake-control cables with a clamping force determined by the motor torque applied by the electric motor;

and the electric motor is supplied from the vehicle battery via a pilot circuit, which is designed in such a way as to control the electric current passing through the electric motor, this electric current being computed and controlled by the controller, one output port A of which is connected to appropriate inputs of the pilot or drive circuit.

According to another aspect of the invention, the assistance device is implemented in the form of a program that is saved and executed on the vehicle computer.

Other characteristics and advantages of the present invention will be better understood on the basis of the description and of the attached drawings, wherein:

FIG. 3 is a graph representing the clutch-pedal position at which the vehicle can be held stationary on a slope, whose gradient is represented by the abscissa;

FIG. 4 is a block diagram representing a first embodiment of part of the device of FIG. 1;

Figure 1:
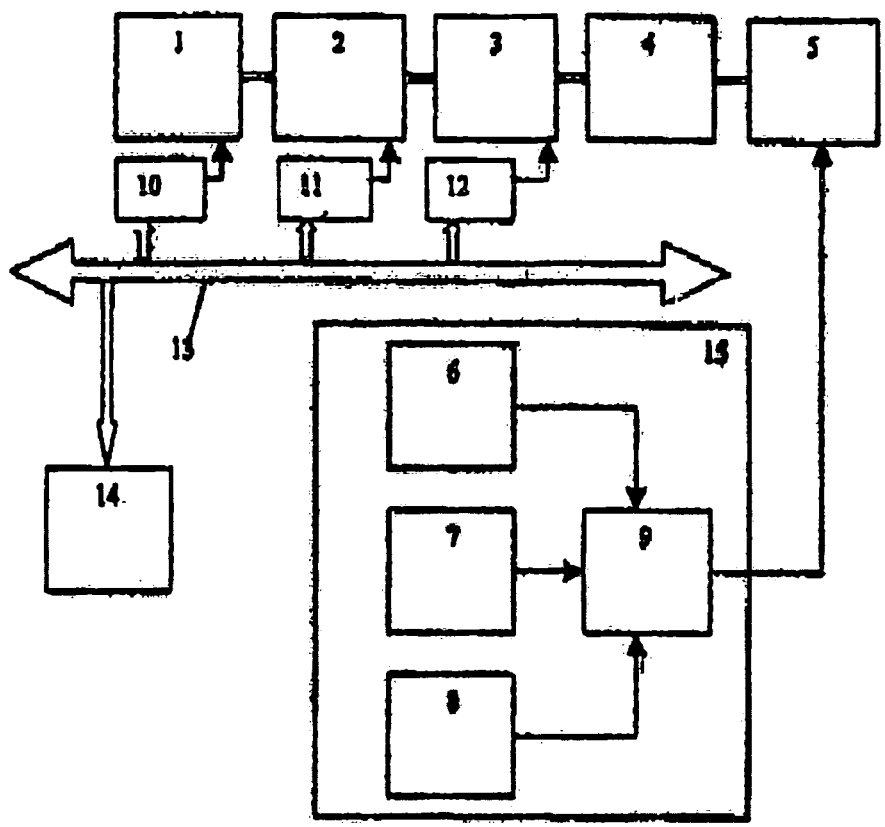
FIG. 1 is a block diagram of a vehicle equipped with an inventive device for assisting uphill maneuvers.

FIG. 1 illustrates a block diagram of a vehicle equipped with an inventive device for assisting uphill maneuvers. The vehicle is provided with a motive power unit 1 connected via its output shaft to a clutch 2, whose output shaft is connected to the primary shaft of a gearbox 3, whose secondary shaft is connected in known manner to the driving wheels 4 of the vehicle. A mechanical brake system 5 acts on the wheels, for example driving wheels 4 or on other vehicle wheels, depending on the type of propulsion used. Motive power unit or engine 1 is controlled by an accelerator pedal or any other appropriate means at the discretion of the driver or of a central control unit 14 connected by a signaling bus in the vehicle, such as a CAN bus 13. Clutch 2 cooperates with a clutch-disengaging element 11, which may be a clutch pedal maneuvered by the driver or an actuator that can be controlled from CAN bus 13 by central control unit 14 of the vehicle. Gearbox 3 cooperates with a gear-ratio control element 12, such as a shift lever maneuvered by the driver, or such as an automatic ratio-change element controlled from CAN bus 13 by central control unit 14.

Inventive device 15 for assisting uphill maneuvers is provided with:

a means 6 for estimating the slope to be negotiated by the vehicle;

a means 7 for interpreting and anticipating the commands of the driver and/or of a central driving unit;

a means 8 for determining the instantaneous clutch characteristics;

a means 9 connected to the foregoing three means 6 to 8 for effecting a brake-system release command;

in such a way that the vehicle is held on the slope during the maneuver.

Inventive device 15 for assisting uphill maneuvers takes into account the slope, the wish of the driver and the degree of wear of the clutch. Device 15 exploits:

a means for identifying the clutch-engagement curve in order to estimate instantaneously the torque transmitted by clutch 2 as a function of the position of clutch pedal 11 during the phases of ratio changes in gearbox 3;

a means for establishing and exploiting a map, which can be parameterized in particular during initialization or holding phases of the vehicle, providing the value of the brake-release torque as a function of the vehicle slope and, finally, a means for interpreting and anticipating the actions of the driver on the pedals.

Brake device 5 may be provided with two mechanical brakes that act on wheels 4 and that can be directly controlled by assistance device 15, for example via a brake actuator that can be controlled from signaling bus 13. On the other hand, it may also use an electric parking brake device, such as that described in the patent application cited hereinabove, filed on the same date in the name of the same Applicant, wherein the clamping force acts directly on brake system 5.

Figure 2:
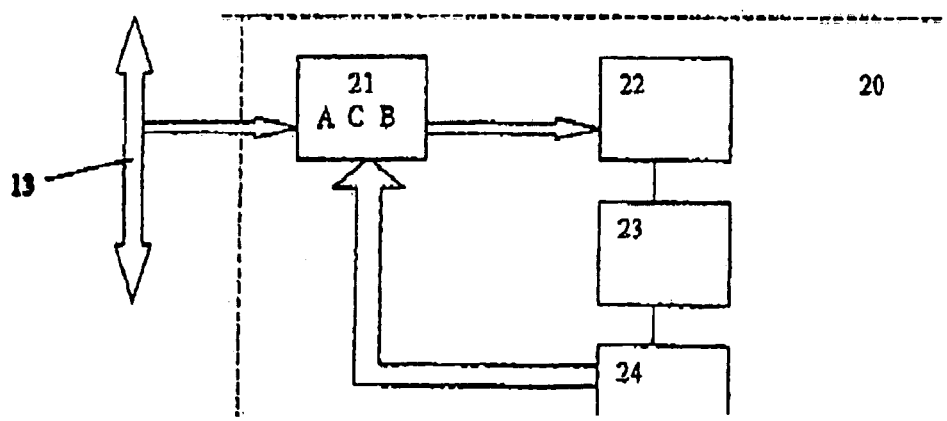
FIG. 2 is a block diagram of an electric parking-brake device exploited by the inventive device in a preferred embodiment.

In FIG. 2 there is described such an electric brake device. It is provided essentially with a box 20 disposed, for example, close to the axle carrying brake system 5, which itself is composed of mechanical brakes 26 and 27 acting on the left and right wheels respectively. It is self-evident that these wheels may or may not be wheels connected to engine 1 as illustrated in FIG. 1

Each brake 26 or 27 may be controlled by an actuator controlled directly by a brake circuit, which is not illustrated and is not a direct concern in the embodiment described here. Nevertheless, in another embodiment, this brake circuit may itself be directly controlled by the inventive device for assisting uphill maneuvers instead of and in place of electric device 20 illustrated in FIG. 2.

When the inventive device for assisting uphill maneuvers cooperates with an electric brake device 20, the latter is provided with a controller 21 connected to signaling bus 13, to which the output port of device 15 of FIG. 1 is then connected. Device 15 (FIG. 1) then is a control element working according to the protocol of bus 13, and electric parking-brake device 20 is a controlled element working according to the protocol of bus 13. Such a protocol may be the CAN protocol.

Controller 21 is connected to bus 13 via an input/output port B, and it exchanges the diverse necessary data. Controller 21 then is provided with means for receiving data representative of the clamping force applied to mechanical brakes 26 and 27 of brake system 5, this force being measured by a force sensor 24 interposed between an electric motor 23 mounted in box 20 and a mechanical converter 25, an articulated output lever of which makes it possible to urge two control cables of brakes 26 and 27 with a clamping force determined by the motor torque applied by electric motor 23.

Electric motor 23 is supplied from the vehicle battery (not illustrated) via a pilot circuit 22, which is designed in such a way as to control the electric current passing through the electric motor, this electric current being computed and controlled by controller 20, one output port A of which is connected to appropriate inputs of pilot or drive circuit 22.

In such an arrangement, inventive device 15 for assisting uphill maneuvers, by virtue of its computing means 9, generates a release instruction for brakes 26 and 27, destined for brake system 5 in correspondence with the various inventive parameters, which will now be described.

The device for assisting uphill maneuvers exhibits the following advantages:

1. it is insensitive to clutch wear,
2. it is insensitive to manufacturing tolerances of the clutches,
3. it is only slightly sensitive to body pitching at standstill, as can be caused, for example, by movement of the vehicle passengers,
4. it adapts itself to the manner in which the driver pulls away from standstill,
5. it can be easily parameterized by clearly identified test procedures.

In the description hereinafter, the parameters listed below are taken into account, detected, stored in memory, computed or controlled by the inventive means. The first column identifies the name of the mathematical variable, the second column describes the function of the variable or parameter, and the third column indicates the unit of measurement of the variable or parameter.

The effort variables are:

| | | |
|---|---|---|
| $C_{m_{CME}}$ | the mean effective torque delivered by the engine, estimated by the engine computer | N · m |
| $C_T$ | torque transmitted by the clutch | N · m |
| $C_R$ | torque applied to the wheel | N · m |
| $F_X$ | total longitudinal force of contact friction between the tire and ground for the vehicle | N |
| $\hat{C}_T$ | estimate of the torque transmitted by the clutch | N · m |
| $C_{RES}$ | friction torque in the transmission chain, wheel included | N · m |

The kinematic variables are:

| | | |
|---|---|---|
| $\omega_m$ | angular velocity of rotation of the engine | rad · s$^{-1}$ |
| $\omega_R$ | angular velocity of rotation of the front wheels | rad · s$^{-1}$ |
| v | ground speed of the vehicle | m · s$^{-1}$ |
| $\theta_{emb}$ | position of the clutch pedal | % |
| $\theta_{acc}$ | position of the accelerator pedal | % |
| $\theta_V$ | slope of the vehicle | rad |

The mechanical and geometric parameters are:

| | | |
|---|---|---|
| $J_m$ | rotational inertia of the engine shaft (representing the engine inertia + primary clutch-plate inertia) | kg · m$^2$ |
| m | mass of the vehicle | kg |
| b | shift-lever position b ∈ {−1 0 1 . . . 6} | — |
| r(x) | function giving the gearbox and axle ratio as a function of the shift-lever position | — |
| $\rho_c$ | radius of the tires under load | m |
| g | magnitude of the gravitational acceleration vector | ms$^{-2}$ |

The principle of the solution employed in the inventive assistance device will now be described.

A vehicle parked on a slope must overcome the force of gravity in order to start. This force is a function of the slope $\theta_V$ and of the mass m of the vehicle, and is equal to mg sin $\theta_V$. The torque $C_{T_D}$ that must be transmitted by the clutch to the wheel for start is then given by the following relation:

$$C_{T_D} = r(b)\rho_c mg \sin \theta_V + C_R, \qquad (1)$$

where r(b) is the gearbox ratio corresponding to shift-lever position b and $C_R$ is the residual friction torque in the transmission chain, including the rolling resistance of the tires.

The strategy applied by the device for assisting uphill maneuvers is based on the use of this relation. It comprises releasing the parking brake while the clutch is being engaged at standstill, as soon as the torque $C_T$ transmitted by the clutch becomes greater than $C_{T_D}$. More generally, means 9 for effecting a command to release brake system 5 generates a brake-system release command while clutch 2 is being engaged with the vehicle at standstill and the engine running when the driver or an automated clutch system starts to clutch, when the torque transmitted by the clutch becomes greater than the starting torque at the wheel.

Another aspect of the invention comprises estimating the torque transmitted by the clutch.

In one embodiment of the invention, the inventive device is provided with a means for determining the torque from a priori knowledge of the clutch friction curve representing the friction torque as a function of clutch-pedal position. This friction torque is the torque that can be transmitted by the clutch. For a given vehicle equipped with the inventive device, there is provided a means for indicating the position that the clutch pedal must occupy in order to generate a starting torque that balances the weight of the vehicle on the slope. This means therefore works as a function of the slope, or in other words the inventive device is provided with a means for solving the following equation as a function of clutch position $\theta_{emb}$ for each value $\theta_V$ of the slope:

$$C_T(\theta_{emb}) = r(b)\rho_c mg \sin \theta_V + C_R, \qquad (2)$$

where $C_T(\theta_{emb})$ is the clutch-torque characteristic. In one embodiment of the invention, the clutch-torque characteristic is saved in the form of a map, or in other words a table containing pairs of entries, stored in memory in means 7. Such a table can be established graphically according to curve 29, by measuring, for different slopes on which the vehicle is located, the clutch-pedal position that holds the vehicle on the slope. The succession of measurements can then be represented as illustrated in FIG. 3, where the abscissa represents the slope in percent and the ordinate represents the clutch-pedal position. By applying relation (2), it is then possible to deduce therefrom a table wherein the first entry is the clutch-pedal position $\theta_{emb}$ and the values of the transmittable torque $C_T$ can also be deduced from relation (2) by computing in each case with the slope $\theta_V$ taken from the graph of measurements of FIG. 1. These various values can be saved in an appropriate memory of means 7 during initialization of inventive assistance device 15.

Figure 5:
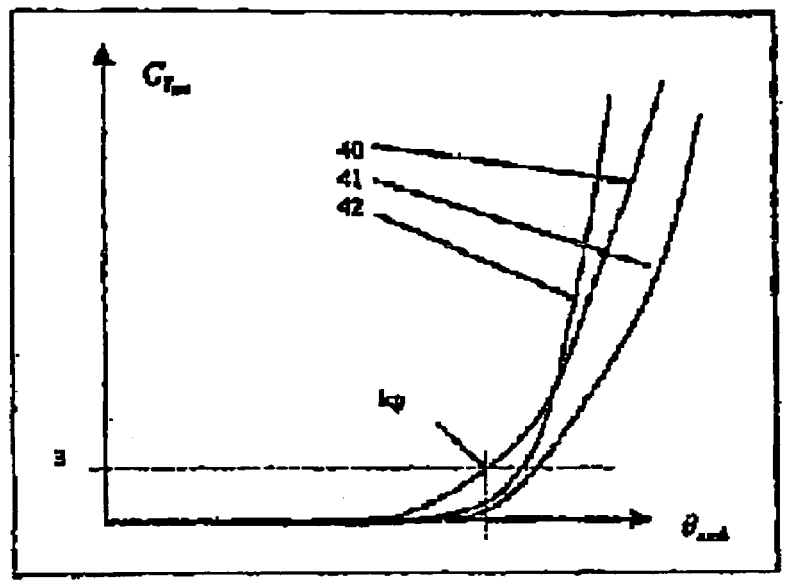
FIG. 5 is a graph representing cases of clutch aging, a defect that can be alleviated by a special inventive device.

FIG. 5 shows a series of curves 40, 41 and 42, which represent the response of clutch 2 to depression of the clutch pedal or to a command having an equivalent effect during three stages of the life of the clutch.

Exclusively curve 41 will be discussed for the time being, but later the significance of curves 40 and 42 will also be explained. When the vehicle starts to move, the clutch response, which is expressed by the torque at the wheel, generates a certain value $C_T$ of the torque at the wheel, which the motor generates. Knowing the degree $\theta_{emb}$ of depression of the clutch pedal, the parameter represented by the abscissa of the clutch characteristic of FIG. 5, it is therefore possible to determine the value of the torque $C_T$ transmitted to the wheel without the need for special measurement.

FIG. 4 shows a part of device 15 of FIG. 1 for assisting uphill start wherein there is employed the strategy described in the foregoing.

The assistance device of FIG. 4 is provided with a slope sensor 30. Slope sensor 30 may be provided with a sealed cell and two electrodes immersed in a conductive liquid. The electrodes are connected in series to a source of electric voltage (not illustrated) and to a circuit for measuring the electric current passing through the series circuit formed in this way. The measurement of the electric current, or of any other electric parameter that varies in the sensor when this is inclined in such a way that the contact areas between the electrodes and the conductive liquid vary monotonically with slope angle, therefore makes it possible to address a table, containing pairs of entries, saved in a memory means associated with sensor 30 (and not illustrated in the figure), in such a way that the comparison of the calibrated and digitized measurement with the said electrical measurement by using an appropriate converter (not illustrated in the figure) is itself converted to a measured signal for slope $\theta_V$ by addressing the memory means in which the response characteristic of sensor 30 as a function of slope is saved.

The measured signal issued from sensor 30 is sent to the input of transmitted-torque generator 32, which in practice is provided with a memory means (not illustrated) containing a table, which is addressed in a manner that depends on the slope and therefore on the measured signal issued from sensor 30, in order to generate at the output an estimate of the torque transmitted to the wheel to ensure that the vehicle is held on the slope measured in this way. The memory means containing a table whose address depends on the slope provides as output value the succession of wheel-torque values which solve relation (2) as a function of the slope on which the vehicle is located.

It is noted that relation (2) also depends on the mass of the vehicle. In one embodiment, it is provided that the memory means containing a table whose address depends on the slope saves a plurality of characteristics of torque transmitted to the wheel as a function of slope, each $CAR_i$ being computed and/or measured for a vehicle mass $m_i$, and the table containing the relation to mass being addressed by a vehicle-mass estimator (not illustrated), which is connected to the input of generator 32.

The clutch pedal or a suitable element for control of clutch 2 (FIG. 1) is coupled to a sensor 31 for detecting the degree of depression of the clutch pedal. This sensor generates an output signal $\theta_{emb}$, which is transmitted to the input of a wheel-torque estimator 33, which is provided with a memory means in which there is saved clutch characteristic 41 of FIG. 5. As a result, for a degree $\theta_{emb}$ of depression of the clutch pedal, generator 33 generates an output signal $C_T$ representative of the torque actually applied to the wheel during uphill start or during any clutch-reengagement operation. The memory means in which the clutch characteristic is saved cooperates with an input means, by which an estimated value of the torque $C_T$ being generated at the wheel by transmission chain 1 to 4 (FIG. 1) of the vehicle can be generated for a value of the clutch-pedal depression parameter $\theta_{emb}$.

Finally, in the embodiment of FIG. 4, the inventive assistance device is provided with a comparator 34, which receives at a first input the output signal of generator 32 representative of the torque for holding on the slope, and at a second input the output signal of estimator 33 representative of the estimated torque at the wheel. Comparator 33 generates a signal to release brakes 35 only when the condition $C_{Tmax} \leq C_T$ is satisfied.

It is noted that the inventive assistance device may begin to function several times during an uphill maneuver, especially if the aforesaid condition is once again no longer satisfied for a particular reason (because of a change of slope, engine speed, driver's command or other reason).

In such a case, the inventive device also cooperates with a brake-reactivation means (5, FIG. 1), which commands reclamping of the brakes.

The strategy employed in the embodiment of the device illustrated in FIG. 4 functions satisfactorily. Nevertheless, it is sensitive to wear and aging of the clutch. In a preferred embodiment, the inventive assistance device is therefore provided with a means for recalibrating, during use of the vehicle, the clutch characteristic as illustrated in FIG. 3 and saved in generator 32.

The means for recalibration of the map of the clutch torque will now be described.

The clutch-torque characteristic is the relation between the position of clutch pedal 11 and the torque that can be transmitted by the clutch. This characteristic is represented by a curve having the appearance illustrated in FIG. 5. On this curve there is defined the kiss point kp or the position of brake pedal 11 at which the torque transmitted by clutch 2 in slipping condition is arbitrarily 3 N.m.

This characteristic evolves in time, with wear of the friction-plate lining and "wear" of the compression springs of clutch 2.

The data available on the vehicle and transmitted by assistance device 15 are the following:

$C_{m_{CME}}$: effective mean torque delivered by engine 1, estimated by a control computer (not illustrated) of engine 1 and available at any instant on bus 13, in N.m $\omega_m$: angular velocity of rotation of engine 1, measured by an engine-speed sensor (not illustrated) and available at any instant on bus 13, expressed in rad.s$^{-1}$, $\omega_R$: angular velocity of rotation of wheels 4, measured by a sensor (not illustrated) for measuring the rotational speed of wheels 4 or computed by a means (not illustrated) for estimating the angular velocity of wheels 4 as a function of the angular velocity of rotation of the engine and of the various transformation ratios of the transmission chain and available at any instant on bus 13, expressed in rad.s$^{-1}$, v: ground speed of the vehicle, measured by a sensor (not illustrated) for measuring the ground speed of the vehicle or a means (not illustrated) for measuring the ground speed of the vehicle and available at any instant on bus 13, expressed in m.s$^{-1}$, $\theta_{emb}$: clutch-pedal position, measured by a sensor (not illustrated) for measuring the degree of depression of the clutch pedal and available at any instant on bus 13, in %, $\theta_{acc}$: accelerator-pedal position, measured by a sensor (not illustrated) for measuring the degree of depression of the accelerator pedal and available at any instant on bus 13, in %.

There will now be described a means, also referred to as transmitted-torque estimator, for estimating the curve of the torque transmitted by clutch 2 during the phase of clutch engagement for the purpose of downshifting the ratios, or in other words when element 12 for controlling the ratios of gearbox 3 produces speed ratios shifting down from position "five" or "six" to the first speed or ratio "one". In fact, according to the invention, the transmitted-torque estimator works during the phases of downshifts of the ratio. The observation conditions are illustrated in FIG. 6.

Figure 6:
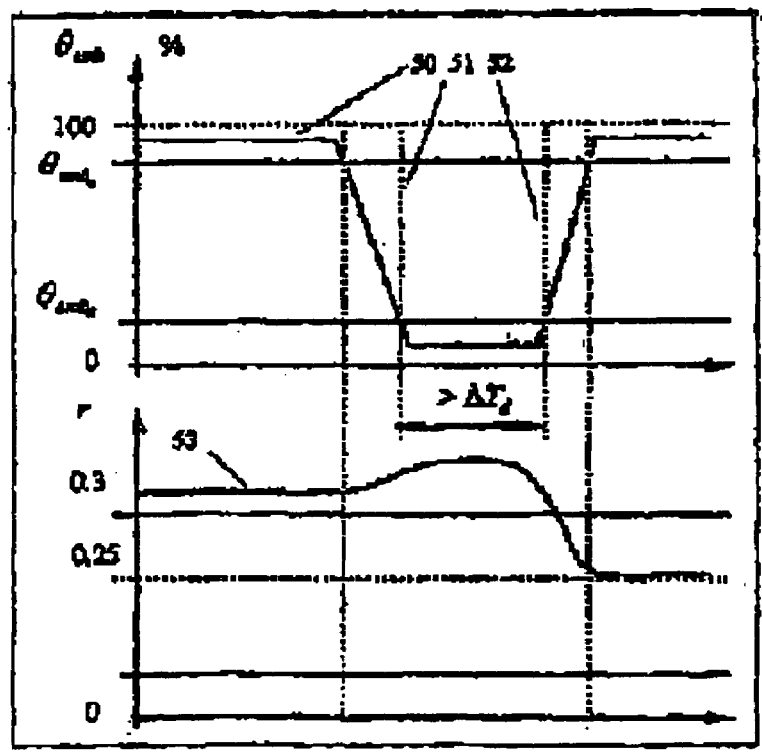
FIG. 6 shows several graphs that explain an inventive means for taking clutch aging into account.

FIG. 6 shows, from bottom to top:

a first graph representing the variation of the transmission ratio r;

a second graph representing the variation $\theta_{emb}$ of the degree of depression of the clutch pedal in the course of time t.

The transmitted-torque estimator is provided with a memory containing two predetermined constants, which are:

$\theta_{emb_je}$, which indicates a threshold determining that the pedal is in a clutch-engaging position if $\theta_{emb_je} > \theta_{emb}$;

$\theta_{emb_jd}$, which indicates a threshold determining that the pedal is in a clutch-engaging position if $\theta_{emb} < \theta_{emb_jd}$.

The transmitted-torque estimator is also provided with a means for detecting a change of ratio, defined by detection of one passage of the clutch pedal through a high position, then a low position, then a high position, such as represented by curve 50. The means for detecting a change of ratio is therefore provided with a means for detecting a high position and a means for detecting a low position. These means are defined according to the following table:

High position $\theta_{emb} > \theta_{emb_e}$
Low position $\theta_{emb} < \theta_{emb_d}$ In addition to the two means for detecting a high position and a low position, the means for detecting a ratio change is therefore provided with a means for detecting a sequence during which the means for detecting a high position, then the means for detecting a low position, then the means for detecting a high position is successively active. For this purpose, the means for detecting clutch-position sequences is provided with two inputs and a serial-access memory that saves a "1" each time that one of the means for detecting a high or low position is active, and does so in the aforesaid sequence. When the state word saved in the serial-access memory is acquired at the end of the third state change, a comparator (not illustrated) connected both to the serial-access memory and to a permanent memory of the word representative of the sequence being sought switches to active state, thus setting the output of the means for detecting a ratio change to active state in order to indicate that a ratio change has occurred.

It is noted on the second graph that a clutch-disengagement duration $\Delta T_d$ is indicated between instants 51 and 52. Before instant 51, the transmission ratio r (first graph) has a value of 0.3. Then, after instant 52, the transmission ratio r is equal to 0.25 when the detected ratio change is of the downshift type. Between these two states, the transmission ratio r evolves in indeterminate manner.

The inventive transmitted-torque estimator then includes a means for estimating a point on the transmitted-torque characteristic by using an estimate of the mean torque at the wheel.

The means for estimating a point of the transmitted torque uses the relation defining the torque transmitted by clutch 2 as a function of the transmission ratio r applied by gearbox 3, especially as a function of the engaged speed ratio b, defined by $C_T = r(b) \times C_R$. The means for estimating a point of the transmitted torque is provided with a computing means for executing the operation $\hat{C}_T = C_{m_{EST}} - J_m \dot{\omega}_m$ that returns the estimated value of the transmitted motor torque.

Figure 8:
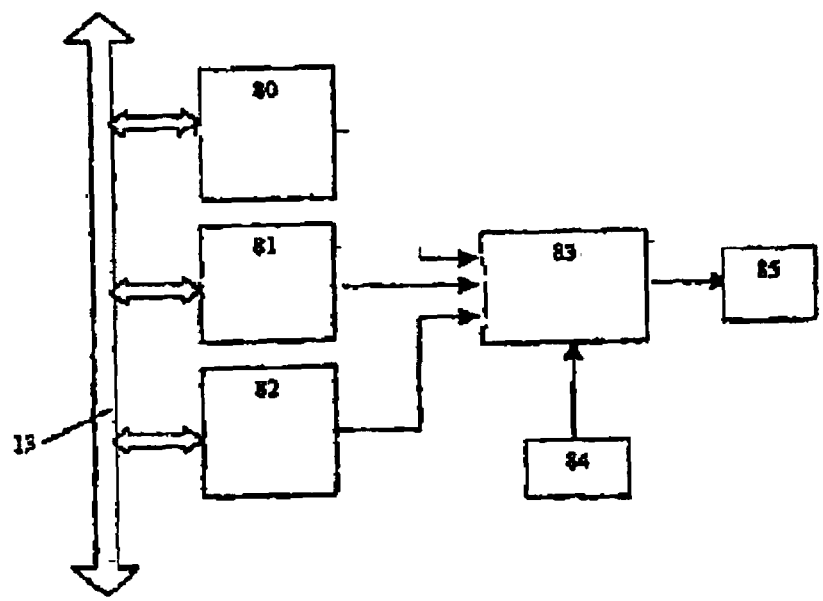
FIG. 8 is a block diagram of an alternative embodiment of part of the inventive device.

The means for estimating a point of the clutch-engagement curve works a posteriori after having brought about functioning of the following means illustrated in FIG. 8:

a first test means 80, which generates an active test signal when there are no loads on line, and which indicates that the estimate of the engine torque is valid;

a second test means 81, which generates an active test signal during the clutch-reengagement phase and which functions as described hereinabove;

a means 82 for estimation of the transmission ratio r(b) during the clutch-engagement phase (after instant 52, FIG. 5);

a means 83 for computing the slipping rate $$\Delta\omega = \omega_m - \frac{\omega_R}{r(b)}$$

of the clutch.

Computing means 83 is connected to sensors 84 for measuring the vehicle speed and engine speed, and it generates an output signal $\Delta\omega$ destined for a means 85 for validating the sensing of a point of the clutch-engagement curve.

The conditions for sensing of a point (with index i) of the clutch-engagement curve are detected using two test means internal to validation means 85, which execute the following tests respectively:

$$C_{TMIN_i} \leq \hat{C}_T \leq C_{TMAX_i}$$

$$\Delta\omega \leq \Delta\omega_{SEUIL} < 0$$

in such a way that, when the two test means have verified that the conditions are satisfied, an appropriate output terminal of validation means 85 delivers a sensed point on the clutch-engagement curve, the point being defined by $P_i = (C_{T_p}, \theta_{emb_i})$, which defines the point sensed in the course of clutch reengagement.

The three threshold values $C_{TMIN_p}, C_{TMAX_i}$ and $\Delta\omega_{SEUIL}$ of the foregoing two tests are therefore saved, as is known, in permanent memories of validation means 85.

The transmitted-torque estimator is therefore provided with a means for performing a specified plurality of operating cycles of the means for estimating a point of the clutch-engagement curve, in such a way that the curve, such as curve 40 or 41 or 42, can be saved at a predetermined number of points Pi in the appropriate means of the inventive assistance device.

Finally, the transmitted-torque estimator is provided with a means for initiating a new estimate of the transmitted-torque characteristic during the life of the vehicle, which is active in particular during a holding operation on the vehicle, at the time of a specific command by the driver, and when a means for detecting that the identified transmitted-torque curve is no longer suitable is undergoing a transition to the active state.

In one embodiment, means 85 for validation of the sensed point cooperates with a means (not illustrated) for filtering the modeling and measurement errors, which is provided with a tool for generating an average of the positions of the points sensed in this way.

The device for assisting uphill start described hereinabove works on a purely theoretical brake-release criterion, based solely on the torque for holding the vehicle on the hill. Numerous tests performed on vehicles show that this threshold is satisfactory for low clutch-engagement rates. For high clutch-engagement rates, the vehicle passengers have the feeling of being held back before breaking loose.

To overcome this disadvantage, the inventive assistance device is also provided with a means for managing the wish or intention of the driver, in order to anticipate the brake-release command, to ensure that this command acts effectively at the theoretical brake-release position.

In addition, the capability of anticipation by taking into account the activity of the driver on the accelerator pedal is necessary. In fact, at the theoretical instant of clutch disengagement, the torque delivered by the engine must be at least greater than the torque transmitted into the clutch, because otherwise the engine would almost always stall.

To overcome this other disadvantage, the inventive assistance device is provided with a means for testing two conditions:

1—the driver is accelerating in order to prevent stalling,

2—the engine speed is sufficient to generate the torque demanded by the driver.

Figure 7:
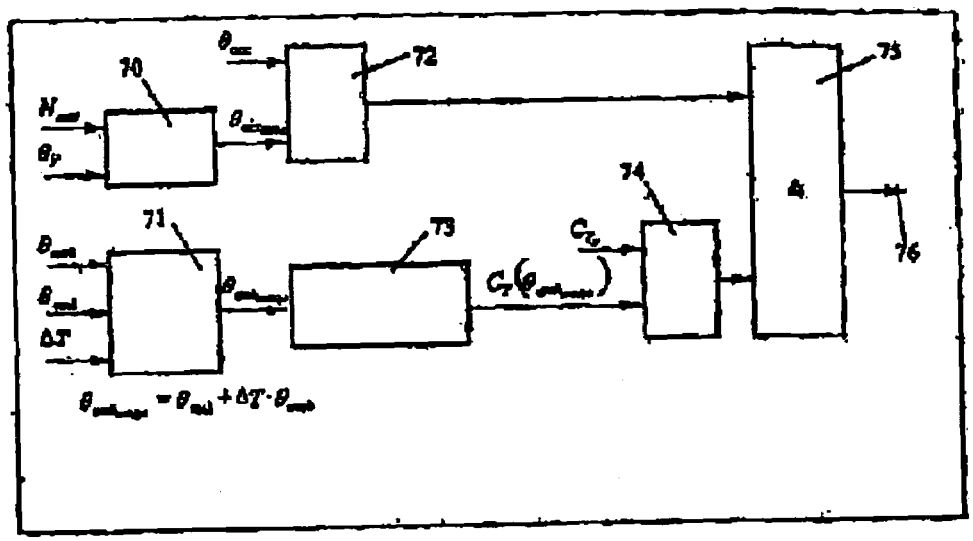
FIG. 7 is a block diagram of another embodiment of part of the device of FIG. 1 for anticipating the intent of the driver.

FIG. 7 shows another embodiment of the assistance device of FIG. 1, in which the two aforesaid disadvantages have been overcome. The various parameters indicated on FIG. 7 are generated by specialized sensors or estimators, as has been described or defined hereinabove. Preferentially, these parameters are available in the form of signals exchanged on bus 13 (not illustrated in FIG. 7) and the means of the device of FIG. 7 are configured for exchange with bus 13.

The inventive device is provided with a first means 70 for generating a threshold value for the depressed position of the accelerator pedal as a function of engine speed. Means 70 then executes a function defined analytically by $\theta_{acc_{SEUIL}} = f(\theta_V, Nm)$, in which the two arguments are the slope on which the vehicle is located and the engine speed.

The output signal of generator 70 is a threshold signal for the degree of depression of the accelerator pedal. The threshold signal is preferentially saved in a table containing pairs of entries comprising the value of the slope and the engine speed. The threshold signal is then delivered to a first input of a comparator 72, which receives the degree of depression of the accelerator pedal at a second input. The comparator generates an active output signal if the condition $\theta_{acc} \geq \theta_{acc_{SEUIL}}$ is satisfied.

The inventive device is provided with a second means 71 for generating an anticipated braking signal having a predetermined duration $\Delta T$, which is saved in an appropriate memory of the assistance device. Generating means 71 executes the function $\theta_{emb_{anticipé}} = \theta_{emb} + \Delta T \times \theta'_{emb}$, in which the function $\theta'_{emb}$ is the instantaneous derivative of the depressed position of the clutch pedal. It is noted that the anticipated degree of depression will become increasingly larger as the rate of release of the clutch pedal becomes greater.

The inventive device is therefore provided with a means for generating the estimated parameter $\Delta T$ as a function of the slope on which the vehicle is being held.

The signal representative of the anticipated degree of depression of the clutch pedal is then transmitted to the address input of a generator 73 that generates at its output a value representative of the torque transmitted to the wheel in order to hold the vehicle on the hill. Generator 73 works and is updated in accordance with the foregoing description. The output value generated by generator 73 is a function $C_T(\theta_{emb_{anticipé}})$, which is transmitted to an input of a comparator 74, another input of which is connected to the output of the transmitted-torque estimator (not illustrated) described hereinabove, in such a way that comparator 74 sets its output to the active state if the condition $C_{T_D} > C_T(\theta_{emb_{anticipé}})$ is satisfied.

The outputs of the two comparators 72 and 74 are connected to the input terminals of a logical AND gate 75, whose output 76 is transmitted as a release instruction for vehicle brakes 5 when output 76 is in the active state.

There will now be described another embodiment of a means for estimating the characteristic of the torque transmitted to the wheel. This estimator exploits a parametric model as a function of the clutch-pedal position. To hold the vehicle on the hill, the transmitted-torque estimator is provided with a transmitted-torque generator, whose output signal is defined by the following parametric relation:

$$C_{T_{MAX}} = \begin{vmatrix} 0 & \text{if } \theta_{emb} \le \theta_{kp} \\ c_0(\theta_{emb} - \theta_{kp})^{d_0} & \text{if } \theta_{emb} > \theta_{kp} \end{vmatrix} \quad (4)$$

where $c_0$ and $d_0$ are form factors and $\theta_{kp}$ is the kiss point of the clutch, defined arbitrarily for a small value of the measured degree of depression of the clutch pedal. The function $C_{T_{MAX}}$ is composed of a first constant function (zero), then of a second function of power type.

It is seen that, if two measured points of torque $C_{T_{MAX}}$ were known, for example $C_1$ and $C_2$ for two values of the degree of depression of the depression pedal during the start of the maneuver, where $\theta_{kp}+A$ and $\theta_{kp}+2A$ are these degrees beyond the kiss point, there would be obtained:

$$C_1 = c_0 A^{d_0} \qquad d_{0i} = \frac{\ln(C_1) - \ln(C_2)}{\ln(2)}$$

which would then yield $$C_2 = c_0(2A)^{d_0} \qquad c_{0i} = \frac{A^{d_{0i}}}{C_1}$$

which are the two identifiers of the sought clutch-engagement curve.

To avoid performing relatively complex computations, it is preferred in one embodiment of the invention to use a clutch-engagement curve identifier that is provided with a memory containing a set {TABLE($d_0$, $c_0$); $c_0$, $d_0$} of the values of $C_{T_{MAX}}$ as a function of at least the first values of the degree of depression of the clutch pedal. The tables are computed for the expected values of the form factors $c_0$ and $d_0$. Each table is therefore defined by its address as expressed by the pair ($c_0$, $d_0$) of form factors, and it contains at least two values of the clutch torque, such as $C_1$ and $C_2$, for two values of the degree of depression predetermined in advance, such as $\theta_{kp}+A$ and $\theta_{kp}+2A$.

The inventive device is also provided with a means for estimating the clutch torque that generates, at each instant, or at least during the onset of the clutch-engagement phase, the value actually applied by the internal combustion engine to the vehicle wheels. Such a clutch-torque estimator takes into account the idling speed and the characteristics of the kinematic chain disposed between the wheels and the internal combustion engine.

When the driver begins to depress the pedal, an electronic unit, which controls the clutch-curve identifier and which receives the values $\theta_{emb}$ from the sensor of the degree of depression of the clutch pedal as well as the values of the clutch torque corresponding thereto from the clutch-torque estimator, performs on the first received point ($\theta_{kp}+A$, $C_1$) the selection of a subset of tables SEL{TABLE($d_0$, $c_0$); $c_0$, $d_0$} from the previously saved memory of tables in which this first received point is located. Then, as depression of the clutch pedal continues, the electronic controller receives a second point of the clutch-engagement curve characterizing the clutch-engagement state at the given instant, or in other words the second point ($\theta_{kp}+2A$, $C_2$). It then commands a search in the subset SEL{TABLE($d_0$, $c_0$); $c_0$, $d_0$} of previously saved tables for the address of the table whose second point corresponds best to the second point received by the controller, and this address characterizes the pair ($c_0$, $d_0$) of form factors which permits identification of the real clutch-engagement curve. On the basis of this process of identification of the clutch-engagement curve, the vehicle control unit can assign a reliable value of the torque for holding on the slope for a degree of depression of the clutch pedal and any derivative torque variable.

In one embodiment, the inventive device is provided with a means for estimating the transmission ratio r(b). The transmission-ratio estimator (not illustrated) is provided with a means for executing a test starting at values larger than b, which is being decremented, until the following condition is true:

$$\omega_r > [r(b) - 0.5*(r(b) - r(b-1))]\omega_m$$

For this purpose, the transmission-ratio estimator is also provided with a test means, a first input of which receives the signal, generated by an appropriate sensor or estimator and made available on vehicle bus 13, of the speed $\omega_R$ of rotation of the vehicle wheels, and a second input receives the signal, generated by an appropriate sensor or estimator and made available on vehicle bus 13, of the speed $\omega_m$ of rotation of engine 1. The estimator then is provided with a memory of gearbox ratios {r(b); b=6 . . . 1} characteristic of the vehicle when the gearbox ratios are being downshifted and the reading output of the memory is read by a computing element that performs the operation r(b)−0.5*(r(b)−r(b−1)).

The output signal of the computing element is connected to an appropriate input of the test means, which also receives the aforesaid two speeds of rotation and sets its output to active state when the test is satisfied. In this case, the transmission-ratio estimator transmits the value b and/or r(b) at the output over vehicle bus 13. In the opposite case, a decrementer (not illustrated) reduces the value of b by one unit and applies this value as the address of the previously saved memory of gearbox ratios in the transmission-ratio estimator. The next value of the memory is then addressed by the test means.

It is noted that the inventive device is preferentially implemented in the form of a program that is saved and executed on the vehicle computer having the interfaces described hereinabove.

The invention claimed is:

1. A device for assisting uphill maneuvers of a vehicle provided with a motive power unit connected to driving wheels by a clutch and a gearbox, whose ratios can be selected during decoupling of motive power by clutch disengagement, and with a brake system in which at least brake release can be controlled, the device comprising:

means for estimating a slope to be negotiated by the vehicle;

means for interpreting commands of a driver and/or of a central driving unit;

means for determining instantaneous clutch-engagement characteristics, which generates an estimated value ($\hat{C}_T$) of transmitted torque; and means connected to the means for estimating, means for interpreting, and means for determining for effecting a release command for the brake system, such that the vehicle is held on the slope during the uphill maneuver.

2. A device according to claim 1, wherein the means for effecting a release command for the brakes generates an active output signal when the torque transmitted to the wheels is greater than a predetermined value of a holding torque for holding on the slope.

3. A device according to claim 2, wherein the means for effecting is provided with means for generating a predetermined value ($C_{Tmax}$) of the holding torque for holding on the slope.

4. A device according to claim 3, wherein the means for generating a predetermined value ($C_{Tmax}$) of holding torque includes a memory of characteristics of transmitted torques capable of holding the vehicle on the slope, wherein the signal being read is addressed by a detection signal generated by a slope sensor.

5. A device according to claim 4, wherein addressing of the memory also depends on a signal, generated by a vehicle-mass estimator, of a measurement of mass of the vehicle.

6. A device according to claim 4, wherein the memory of characteristics of transmitted torques capable of holding the vehicle on the slope includes means for updating the transmitted-torque characteristics as a function of wear and aging of the clutch.

7. A device according to claim 6, wherein the means for updating includes a transmitted-torque estimator.

8. A device according to claim 7, wherein the transmitted-torque estimator includes means for detecting a gearbox-ratio change.

9. A device according to claim 8, wherein the means for detecting a gearbox-ratio change includes means for detecting a high clutch position and means for detecting a low clutch position, which means for detecting are connected to a sensor for measuring degree of depression of the clutch pedal, and with means for detecting a predetermined sequence of clutch-engagement actions.

10. A device according to claim 7, wherein the transmitted torque estimator includes means for estimating a point on the transmitted-torque characteristic based on an estimation of mean torque at the wheel.

11. A device according to claim 10, wherein the means for estimating a point on the transmitted-torque characteristic includes a computing means for executing an operation $\hat{C}_T = C_{m_{EST}} - J_m \dot{\omega}_m$, that returns an estimated value of transmitted engine torque.

12. A device according to claim 11, wherein the means for estimating a point on the transmitted-torque characteristic further includes:
first test means for generating an active test signal when there are no loads on line and for indicating that the estimate of the engine torque is valid;
second test means for generating an active test signal during a clutch-reengagement phase;
means for estimating a transmission ratio during the clutch-engagement phase;
means for computing a slipping rate $$\Delta\omega = \omega_m - \frac{\omega_R}{r(b)}$$

of the clutch.

13. A device according to claim 12, wherein the means for estimating a point on the transmitted-torque characteristic further includes two test means, internal to validation means and that respectively execute the following tests:

$$C_{TIM_i} \leq \hat{C}_T \leq C_{TMAX_i}$$

$$\Delta\omega \leq \Delta\omega_{SEUIL} < 0$$

such that, when the two test means have verified that conditions are satisfied, an appropriate output terminal of the validation means delivers a sensed point defined by $P_i = (C_T, \theta_{emb_i})$ in a course of clutch reengagement, three threshold values $C_{TMIN_i}$, $C_{TMAX_i}$ and $\Delta\omega_{SEUIL}$ being saved in permanent memories of the validation means.

14. A device according to claim 10, wherein the transmitted-torque estimator further includes means for performing a specified plurality of operating cycles of the means for estimating a point on the transmitted-torque characteristic, such that a memory receives a plurality of sensed points representing an update of the clutch-engagement characteristic.

15. A device according to claim 14, wherein the transmitted-torque estimator further includes means for initiating a new estimate of the transmitted-torque characteristic during a life of the vehicle, which is active during a holding operation on the vehicle, at a time of a specific command by the driver, and when a means for detecting that the identified transmitted-torque curve is no longer suitable is undergoing a transition to the active state.

16. A device according to claim 13, wherein the transmitted-torque estimator further includes means for filtering modeling and measurement errors, which includes a tool for generating an average of positions of the sensed points.

17. A device according to claim 1, further comprising means for managing a wish of the driver, to anticipate a brake-release command, such that brake release takes place at a theoretical brake-release position.

18. A device according to claim 1, further comprising means for anticipation by taking into account activity of the driver on an accelerator pedal.

19. A device according to claim 17, further comprising first means for generating a threshold value for a depressed position of the accelerator pedal as a function of engine speed.

20. A device according to claim 19, wherein the first means executes a function defined analytically by $\theta_{acc_{SEUIL}} = f(\theta_v, N_m)$, in which two arguments are slope on which the vehicle is located and engine speed.

21. A device according to claim 20, wherein the first means is provided with a memory containing a table of pairs of entries comprising a value of the slope and the engine speed, and the first means generates a threshold signal to be delivered to a first input of a comparator, which receives the degree of depression of the accelerator pedal at a second input and generates an active output signal if the condition $\theta_{acc} \geq \theta_{acc_{SEUIL}}$ is satisfied.

22. A device according to claim 19, further comprising second means for generating an anticipated braking signal having a predetermined duration ($\Delta T$), saved in a memory of the assistance device, the second means executing a function $\theta_{emb_{anticié}} = \theta_{emb} + \Delta T \times \theta'_{emb}$, in which the function $\theta'_{emb}$ is instantaneous derivative of the depressed position of the clutch pedal.

23. A device according to claim 22, further comprising means for generating the estimated parameter as a function of the slope on which the vehicle is being held.

24. A device according to claim 22, wherein the signal representative of the anticipated degree of depression of the clutch pedal is transmitted to the address input of a generator that generates at its output, in a form of a function $C_T(\theta_{emb_{anticipe}})$, a value representative of the torque transmitted to the wheel to hold the vehicle on a slope, the value being transmitted to an input of a comparator, another input of which is connected to the output of the transmitted-torque estimator, such that the comparator sets its output to an active state if the condition $C_{T_D} > C_T(\theta_{emb_{antiticipe}})$ is satisfied.

25. A device according to claim 24, wherein outputs of the first and second comparators are connected to input terminals of a logical AND gate, whose output is transmitted as a release instruction for the brakes when the output is in the active state.

26. A device according to claim 7, wherein the transmitted-torque estimator is provided with a transmitted-torque generator, whose output signal is defined by parametric relation:

$$C_{T_{MAX}} = \begin{vmatrix} 0 & \text{if } \theta_{emb} \leq \theta_{kp} \\ c_0(\theta_{emb} - \theta_{kp})^{d_0} & \text{if } \theta_{emb} > \theta_{kp} \end{vmatrix}$$

where $c_0$ and $d_0$ are form factors obtained from a clutch-engagement curve identifier that works in a vicinity of a predetermined kiss point of the clutch.

27. A device according to claim 26, wherein the clutch-engagement curve identifier includes:
- a previously saved memory of tables of predetermined clutch-engagement points for a set of values of form factors, an address of a predetermined table corresponding to a pair of form factors of predetermined values;
- means for estimating the clutch torque at least for two clutch-engagement states close to the kiss point;
- a sensor for measuring the degree of depression of the clutch pedal, to indicate at least one first and one second clutch-engagement state after the kiss point; and
- an electronic controller, including:
    - means for searching, during the first clutch-engagement state following the kiss point, for a subset of tables of clutch-engagement points whose first point corresponds to the first clutch-engagement state, and means for obtaining an estimate generated by the clutch-torque estimator in the first clutch-engagement state,
    - means for searching, during the second clutch-engagement state following the first clutch-engagement state, for the table of clutch-engagement points belonging to said subset whose second point is closest, and means for obtaining an estimate generated by the clutch-torque estimator in the second clutch-engagement state; and
    - means for delivering to an output of the electronic controller a pair ($c_0$, $d_0$) of form factors associated with the table found as identification of the clutch-engagement curve.

28. A device according to claim 8, wherein the means for detecting a gearbox-ratio change includes means for estimating the transmission ratio r(b), which includes means for executing a test beginning with values larger than b, which is being decremented, until the following condition is true: $\omega_r > [r(b) - 0.5*(r(b)-r(b-1))]\omega_m$.

29. A device according to claim 28, wherein the transmission-ratio estimator includes test means, a first input of which receives a signal, generated by a sensor or estimator and made available on the vehicle bus, of a speed of rotation ($\omega_R$) of the vehicle wheels, and a second input receives a signal, generated by a sensor or estimator and made available on the vehicle bus, of a speed of rotation ($\omega_m$) of the engine;
- wherein the estimator includes for this purpose a memory of gearbox ratios {r(b); b=6 . . . 1} characteristic of the vehicle when the gearbox ratios are being downshifted and the reading output of the memory is read by a computing element that executes the operation r(b)−0.5*(r(b)−r(b−1));
- wherein the output signal of the computing element is connected to an input of the test means, which also receives the two speeds of rotation and sets its output to an active state when the test is satisfied, such that, in this case, the transmission-ratio estimator transmits the value b and/or r(b) at the output over the vehicle bus, and such that, in an opposite case, a decrementer reduces the value of b by one unit and applies this value as the address of the previously saved memory of gearbox ratios in the transmission-ratio estimator, a next value of the memory then being addressed by the test means.

30. A device according to claim 1, wherein the brakes cooperate with an electric parking-brake device.

31. A device according to claim 30, wherein the electric brake device includes a box and a controller connected to the signaling bus, the device being a control element working according to the protocol of the bus and the electric parking-brake device being a controlled element working according to the protocol of the bus.

32. A device according to claim 31, wherein the controller is connected to the bus by an input/output port and means for receiving data representative of a clamping force applied to the mechanical brakes of the brake system, measured by a load sensor interposed between an electric motor mounted in the box and a mechanical converter, an articulated output lever of which makes it possible to urge two cables for control of the brakes with a clamping force determined by the motor torque applied by the electric motor;
- and wherein the electric motor is supplied from the vehicle battery via a pilot circuit, configured to control electric current passing through the electric motor, the electric current being computed and controlled by the controller, one output port of which is connected to appropriate inputs of the pilot or drive circuit.

33. A device according to claim 1, implemented in a form of a program that is saved and executed on a vehicle computer.

* * * * *